(12) United States Patent
Howard

(10) Patent No.: US 6,912,238 B2
(45) Date of Patent: Jun. 28, 2005

(54) PARTICLE BEAM DEVICE

(75) Inventor: Robert James Howard, Clifton, VA (US)

(73) Assignee: Lockheed Martin Corporation

( * ) Notice: Subject to any disclaimer, the term of this patent is extended or adjusted under 35 U.S.C. 154(b) by 82 days.

(21) Appl. No.: 10/410,909

(22) Filed: Apr. 10, 2003

(65) Prior Publication Data

US 2004/0202221 A1 Oct. 14, 2004

(51) Int. Cl.[7] .............................. H01S 3/30; H01S 3/09; H01S 3/00; H01S 3/097
(52) U.S. Cl. ............................. 372/69; 372/37; 372/87
(58) Field of Search ........................... 378/95; 313/359; 315/505–507; 372/69, 37, 87, 74, 73; 250/251

(56) References Cited

U.S. PATENT DOCUMENTS

| | | | |
|---|---|---|---|
| 3,940,201 A | * 2/1976 | Micheron et al. | 365/125 |
| 4,218,628 A | 8/1980 | Harris | 307/426 |
| 4,660,203 A | 4/1987 | Hagelstein | 372/5 |
| 4,694,168 A | * 9/1987 | Le Beyec et al. | 250/287 |
| 4,780,647 A | * 10/1988 | Friedman et al. | 315/5.41 |
| 4,847,841 A | 7/1989 | Lamprecht, deceased et al. | 372/32 |
| 4,870,653 A | 9/1989 | Sher et al. | 372/76 |
| 4,879,518 A | * 11/1989 | Broadhurst | 99/606 |
| 4,974,228 A | 11/1990 | Petersen | 372/37 |
| 5,014,014 A | * 5/1991 | Swenson | 315/505 |
| 5,048,032 A | 9/1991 | Ekstrand et al. | 322/34 |
| 5,084,682 A | * 1/1992 | Swenson et al. | 315/505 |
| 5,814,940 A | * 9/1998 | Fujisawa | 315/5.41 |
| 5,849,252 A | * 12/1998 | Wakamoto et al. | 422/186.04 |
| 6,097,740 A | 8/2000 | Palathingal | 372/5 |
| 6,172,463 B1 | * 1/2001 | Cutler et al. | 315/5.42 |
| 6,366,594 B1 | 4/2002 | Bauer et al. | 372/37 |
| 6,433,494 B1 | * 8/2002 | Kulish et al. | 315/500 |

* cited by examiner

*Primary Examiner*—Don Wong
*Assistant Examiner*—Hung Tran Vy
(74) *Attorney, Agent, or Firm*—DeMont & Breyer, LLC

(57) ABSTRACT

A laser and method of producing laser light. The laser and method involve passing a high energy beam of particles through an evacuated chamber. A static electric or magnetic field is established in the chamber in a direction that is essentially perpendicular to the direction of propagation of the beam, but which is a periodically varying field in the direction of propagation. The velocity of the particles and the variation in the field is sufficient to pump the particles into a higher energy state and produce laser light at the output of the chamber.

20 Claims, 2 Drawing Sheets

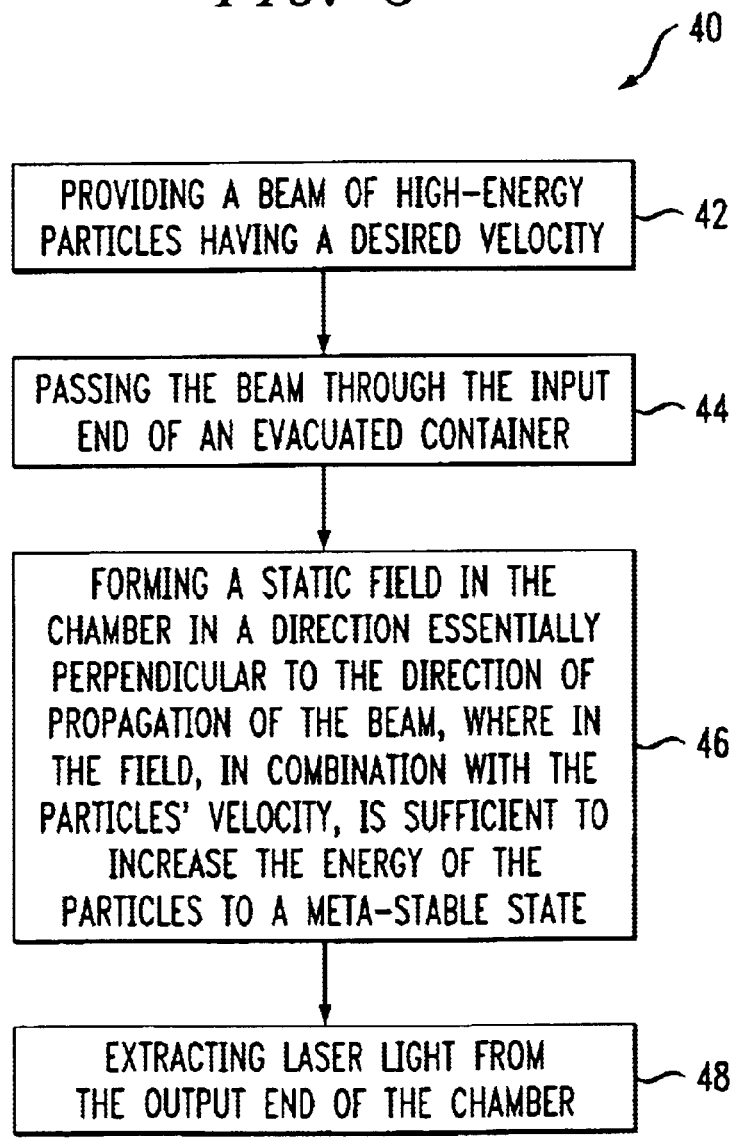

PARTICLE BEAM DEVICE

FIELD OF THE INVENTION

The present invention relates generally to atomic, molecular, and ionic-beam particle lasers and, more particularly, to a method and apparatus for pumping the particles to achieve laser light.

BACKGROUND OF THE INVENTION

High power lasers have become an important technology for weapons, medical uses, and research. These lasers typically use a beam of particles, such as electrons, atoms, molecules, or ions. The particles are pumped to higher energy states, preferably "meta-stable states." The energy stored in the meta-stable state can then be extracted in the form of highly coherent laser light.

Several pumping mechanisms have been proposed. Argon ion lasers have been suggested in which a gas discharge is electrically formed and the discharge is confined by an axial magnetic field. (See, e.g., U.S. Pat. No. 4,847,841.) In some cases, the magnetic field is generated by more than one winding to produce fields of opposite polarity. (See, e.g., U.S. Pat. No. 4,974,228.)

Ion lasers normally employ RF energy or glow discharge to excite ions to a higher energy state and an axial magnetic field to confine the excited medium. (See, e.g., U.S. Pat. No. 5,048,032.) Separate power stages that are out-of-phase can be used to provide multi-phase excitation. In another type of pumping scheme, two electron beams traveling with an ion beam achieve and maintain ionization and the required energy states for the ion beam. (See, e.g., U.S. Pat. No. 6,097,740.)

In the case of free-electron lasers, magnetic fields are often used to accelerate a high-energy beam of electrons normal to the beam direction. Stimulated emission results from the acceleration.

One of the disadvantages of many previous schemes is the need for high power to pump the laser medium. If the input power could be reduced, a higher efficiency device would result.

SUMMARY OF THE INVENTION

The illustrative embodiment of the present invention is a laser that avoids some of the disadvantages of the prior art. A laser in accordance with the illustrative embodiment of the present invention includes an evacuated chamber and a source of high-energy particles selected from atoms, molecules, and ions.

The source of particles imparts a certain velocity to the particles. The evacuated chamber has an input end for receiving the particles and an output end. The chamber includes a comb structure capable of forming a static field along a direction that is essentially perpendicular to the direction of propagation of the particles in the chamber. The static field, in combination with the velocity of the particles, is sufficient to increase the energy of the particles to a higher energy state. Laser light is extracted at the output end of the chamber.

In some embodiments, a method for producing laser light comprises:

providing a beam of high-energy particles selected from atoms, molecules, and ions, wherein the beam has a first velocity;

passing the beam through an input end of an evacuated chamber;

forming a static field in the chamber in a direction essentially perpendicular to the direction of propagation of the beam, wherein the field, in combination with the velocity of the particles, is sufficient to increase the energy of the particles to a higher energy state; and extracting laser light from an output end of the chamber.

It is to be understood that both the foregoing general description and the following detailed description are exemplary, but are not restrictive, of the invention.

BRIEF DESCRIPTION OF THE DRAWINGS

The invention is best understood from the following Detailed Description when read in connection with the accompanying drawings in which:

FIG. 3 depicts a method in accordance with the illustrative embodiment of the present invention.

DETAILED DESCRIPTION

Figure 1:
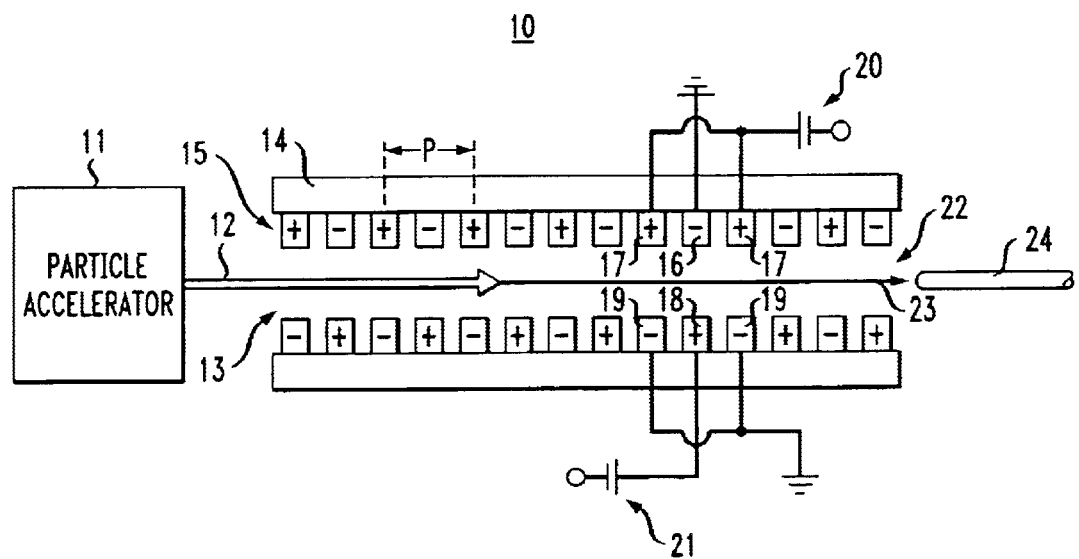
FIG. 1 depicts an apparatus in accordance with a first illustrative embodiment of the present invention.

FIG. 1 depicts apparatus 10 in accordance with the illustrative embodiment. Method 40 for producing laser light in accordance with the illustrative embodiment is depicted in FIG. 3.

Apparatus 10 includes a standard particle accelerator 11, such as an RF linear accelerator, modified cyclotron, or a wake field accelerator, which generates a high-energy beam of particles, illustrated by broad arrow 12. In various embodiments, these particles are atoms, molecules or ions, such as Hg, Zn, Cu, or Au. As described later in this specification, the velocity of the particles is believed to play an important role in creating lasing action in accordance with the present invention. Typically, these particles will have a velocity greater than 0.9c where c is the speed of light. Thus, in accordance with task 42 of method 40, a beam of high-energy particles is provided with a desired velocity.

In accordance with task 44 of method 40, the beam of particles is directed to input end 13 of evacuated chamber 14. Chamber 14 is typically cylindrical, but could have a different shape. Chamber 14 is usually made of glass and is advantageously evacuated to a pressure of below $10^{-8}$ Torr.

Located within the chamber, preferably adjacent to the chamber walls, is comb structure 15. In the illustrative embodiment, comb structure 15 includes upper set of fingers 16 and 17 and lower set of fingers 18 and 19. As used in the specification, the term "comb structure" means any structure having a plurality of electrically-conductive or magnetic fingers (e.g., metal, etc.) arranged in a row along the direction of propagation of the particle beam and extending toward the central axis of the chamber. In this embodiment, the fingers are made of stainless steel or copper, but could be other common metals. It is notable that each finger, e.g., 16, is physically and electrically separated from adjacent fingers, e.g., 17. The fingers are advantageously, but not necessarily, the same size and shape.

Chamber 14 further includes output end 22, where any laser light that is generated in the chamber, as illustrated by arrow 23, can be extracted by standard optical components, such as mirrors (not shown) which direct the light in this example to an optical fiber 24.

In this embodiment, upper fingers 16 and 17 are electrically biased by dc voltage source 20 and lower fingers 18 and 19 are electrically biased by dc voltage source 21. In some other embodiments, a single dc source is used to bias both the upper and lower fingers. Adjacent fingers are alternately at a positive electrical potential (indicated by "+") and ground potential (indicated by "−"). It is to be understood that, for the sake of clarity and simplicity, only some of the electrical connections are depicted in FIG. 1. The magnitude of the voltage is generally chosen to produce a desired potential gradient (the ratio of the magnitude of the voltage to the distance between opposing electrodes, e.g., 16 and 18). For example, with a distance of 1 cm, voltages will usually be in the range of 100–300 kv. Gradients in the range 1 million to 3 million volts per meter are generally desirable.

In operation, the particle beam is incident on the chamber and propagates therethrough. The dc voltage is applied to the fingers so that alternate fingers in a row, e.g., 17 and 16, are positively biased or at ground potential, respectively. Fingers 19 and 18 of the lower row, which oppose fingers 17 and 16 of the upper row, are also alternatively biased at a positive potential or ground but the fingers of the lower row are biased opposite to the corresponding fingers in the first row. That is, finger 19 is at ground potential while opposed finger 17 is positively biased and finger 18 is positively biased while opposed finger 16 is at ground potential.

This biasing scheme results in a static electric field between any two opposing fingers, i.e., in a direction that is essentially perpendicular to the direction of propagation of the beam. As the beam propagates through the chamber, however, it experiences a changing field because of the alternate biasing of the finger pairs. In theory, and not by way of limitation, it is believed that the combination of the velocity of the particles in the beam and the periodic electric field in the chamber will pump the particles into a higher energy state and then decay into a meta-stable state.

Thus, task 46 of method 40 comprises forming a static field in the chamber in a direction that is essentially perpendicular to the direction of propagation of the beam, wherein the field, in combination with the velocity of the particles causes the particles to experience an oscillating RF field that is sufficient to increase the energy of the particles to an excited energy state, in this example, a meta-stable state.

The decay of these particles from the meta-stable state to a lower energy state result in stimulated emission of light (laser light), as indicated by arrow 23. The laser light is extracted at the output end 22 by fiber 24, as per task 48 of method 40.

In one example, the particles are ammonia ions and are accelerated to a velocity of $2.4 \times 10^9$ cm/sec. The period of the electric field in chamber 14 (i.e., the distance between two fingers in a row having the same electrical potential P) is 1 cm. The effective frequency of the electric field (fst) is, therefore, $2.4 \times 10^9$ Hz, which is sufficient to drive the particles into a higher state and produce laser light of 24 GHz, where the primary excitation is expected to derive from the tenth harmonic of the spatial frequency. This approach can be thought of as "resonant pumping" since the periodicity of the electric field and the velocity of the beam are chosen to match the temporal frequency (fp) of the highest excited energy state, where the temporal frequency is the frequency of the energy produced by the decay from the highest energy state. It is also possible to use harmonics of the field experienced by the beam (i.e., n×fst=fp, where n is an integer) in order to produce additional wavelengths of laser light.

Figure 2:
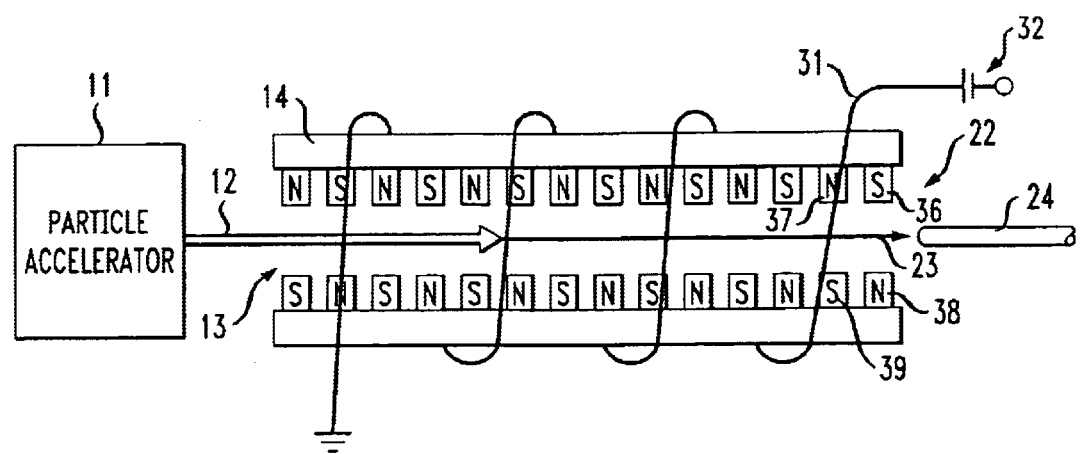
FIG. 2 depicts an apparatus in accordance with a second illustrative embodiment of the present invention.

Similar results can be achieved by replacing the electric field with a magnetic field in chamber 14. This embodiment is illustrated in FIG. 2. It will be noted that in FIG. 2, the fingers of conductive material have been replaced by fingers (e.g., fingers 36, 37, and 38, 39) of magnetic material. In this example, the fingers are made of NDFeB or Sm2Co17. The fingers in a given row (e.g., fingers 36 and 37 of the upper row) are magnetized so that the ends facing the interior of chamber 14 have alternating polarity, indicated by the designations "N" or "S". The fingers in the other row (e.g., fingers 38 and 39 of the lower row) also have an alternating polarity. As for the previous embodiment, the polarity of opposed fingers is opposite. That is, a finger in the upper row having a polarity N is paired with a finger in the lower row having a polarity S.

The fingers can be permanent magnets or be magnetized by coil 31, which is wrapped around chamber 14 and is biased by constant voltage source 32. In either case, the magnetic field generated between opposite fingers will be static in a direction that is essentially perpendicular to the direction of propagation of the beam. In the direction of propagation of the beam, however, the magnetic field will be periodically varying. Again, the combination of the velocity of the beam and the varying magnetic field will cause the particles to be driven to higher energy states, with the result that laser light, indicated by arrow 26, is produced.

Although the invention has been described with reference to illustrative embodiments, it is not intended to be limited to those embodiments. For example, in some variations of the illustrative embodiment, the fingers, e.g., fingers 16 and 17 of FIG. 1 and fingers 36 and 37 of FIG. 2, are placed outside but adjacent to the walls of chamber 14. Furthermore, although alternate fingers in FIG. 1 (e.g., fingers 16) are held at ground potential, in some other embodiments, these fingers are biased at some other potential that is still less than the potential of the adjacent fingers. Thus, the appended claims should be construed to include other variants and embodiments of the invention, as will occur to those skilled in the art, without departing from the scope of the present invention.

What is claimed:

1. A laser comprising:
   a source of high energy particles selected from atoms, molecules, and ions, wherein said source imparts a first velocity to said particles; and
   an evacuated chamber having an input end and an output end,
      wherein said chamber receives the particles at said input end;
      wherein said chamber comprises a comb structure capable of forming a static field along a direction that is substantially perpendicular to a direction of propagation of the particles in said chamber;
      wherein said static field, in combination with said first velocity, is sufficient to increase an energy of the particles to a higher energy state,
      wherein said higher energy state is a metastable state or decays to a metastable state; and further
      wherein said metastable state decays to a lower energy state resulting in the stimulated emission of light.

2. The laser according to claim 1 wherein the field is an electric field.

3. The laser according to claim 1 wherein the field is a magnetic field.

4. The laser according to claim 1 further comprising a dc voltage source and circuitry for biasing said comb structure to generate a field that periodically varies in said direction of propagation of said particles.

5. The laser according to claim 4 wherein a voltage of said dc voltage source is chosen to produce a potential gradient within the range 1 million to 3 million volts per meter.

6. The laser according to claim 1 wherein said comb structure comprises:
   a top row of electrically-conductive fingers; and
   a bottom row of electrically-conductive fingers.

7. The laser according to claim 6 further comprising a dc voltage source and circuitry for biasing said fingers so that adjacent fingers in a row are at different electrical potentials, and pairs of fingers defined by opposing fingers in said top row and said bottom row are also at different electrical potentials.

8. The laser according to claim 7 wherein said first velocity of said particles is chosen; and wherein within said top row and said bottom row, fingers that are at the same electrical potential are separated by a first distance; and further wherein said first velocity and said distance are chosen in combination to result in a desired temporal frequency of said higher energy state.

9. The laser according to claim 6 wherein the fingers comprise magnetic material, and adjacent fingers are magnetized at alternate polarities, and opposing fingers in said top row and said bottom row are also at alternate polarities.

10. The laser according to claim 1 wherein said first velocity of said particles is greater than 0.9 times the speed of light.

11. A method for producing laser light comprising:
   providing a beam of high energy particles selected from atoms, molecules, and ions, the beam having a first velocity; and
   forming a field that is static in a direction that is essentially perpendicular to a direction of propagation of said beam and periodically varies in said direction of propagation, wherein said field, in combination with said first velocity, is sufficient to increase an energy of said particles to a higher energy state, wherein said higher energy state is a metastable state or decays to a metastable state; and further wherein said metastable state decays to a lower energy state resulting in the stimulated emission of light.

12. The method according to claim 11 wherein forming a field further comprises forming an electric field.

13. The method according to claim 12 wherein forming a field comprises forming a potential gradient in the range 1 million to 3 million volts per meter.

14. The method according to claim 11 wherein forming a field further comprises forming a magnetic field.

15. The method according to claim 11 wherein providing a beam further comprises providing a beam having said first velocity greater than 0.9 times the speed of light.

16. A method for producing laser light comprising:
   providing a beam of high energy particles selected from atoms, molecules, and ions, wherein said beam has a first velocity;
   passing the beam through an input end of an evacuated chamber;
   forming a static field in said chamber in a direction that is essentially perpendicular to a direction of propagation of said beam, wherein said field, in combination with said first velocity, is sufficient to increase an energy of said particles to a meta-stable state; and
   extracting laser light from an output end of the chamber.

17. The method according to claim 16 wherein forming said static field further comprises applying a constant dc voltage to a comb structure within said chamber.

18. The method according to claim 17 wherein said comb structure comprises a top row and a bottom row of electrically-conductive fingers, the method further comprising applying said dc voltage so that adjacent fingers in said top row and said bottom row are at different electrical potentials, and opposing fingers in said top row and said bottom row are at different electrical potentials.

19. The method according to claim 18 further comprising generating a desired temporal frequency of a desired metastable state by appropriately selecting:
   a distance between fingers in said top row and said bottom row that are at the same electrical potential; and
   said first velocity of said beam.

20. The method according to claim 16 wherein forming said static field further comprises providing a comb structure having a top row and a bottom row of magnetic fingers, wherein said fingers are magnetized so that adjacent fingers are magnetized at alternate polarities, and opposing fingers in said top row and said bottom row are at alternate polarities.

* * * * *